United States Patent
Tignor et al.

(10) Patent No.: US 6,804,101 B2
(45) Date of Patent: *Oct. 12, 2004

(54) DIGITAL RATING PLUG FOR ELECTRONIC TRIP UNIT IN CIRCUIT BREAKERS

(75) Inventors: Michael S. Tignor, Watertown, CT (US); Patrick Salas, Unionville, CT (US); Craig B. Williams, Avon, CT (US); Michael B. Bradley, Farmington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,997

(22) Filed: Nov. 6, 2001

(65) Prior Publication Data

US 2003/0086230 A1 May 8, 2003

(51) Int. Cl.⁷ .................................................. H02H 9/02
(52) U.S. Cl. ...................................... 361/93.3; 361/93.2
(58) Field of Search .............................. 361/93.1, 93.2, 361/93.3; 340/3–5, 8, 10.1, 10.15

(56) References Cited

U.S. PATENT DOCUMENTS

| | | | |
|---|---|---|---|
| 2,340,682 A | 2/1944 | Powell | 200/147 |
| 2,719,203 A | 9/1955 | Gelzheiser et al. | 200/144 |
| 2,937,254 A | 5/1960 | Ericson | 200/114 |
| 3,158,717 A | 11/1964 | Jeneks et al. | 200/116 |
| 3,162,739 A | 12/1964 | Klein et al. | 200/88 |
| 3,197,582 A | 7/1965 | Norden | 200/50 |
| 3,307,002 A | 2/1967 | Cooper | 200/116 |
| 3,517,356 A | 6/1970 | Hanafusa | 335/16 |
| 3,631,369 A | 12/1971 | Menocal | 337/110 |
| 3,803,455 A | 4/1974 | Willard | 317/33 SC |
| 3,883,781 A | 5/1975 | Cotton | 317/14 R |
| 4,129,762 A | 12/1978 | Bruchet | 200/153 G |
| 4,144,513 A | 3/1979 | Shafer et al. | 335/46 |
| 4,158,119 A | 6/1979 | Krakik | 200/240 |
| 4,165,453 A | 8/1979 | Hennemann | 200/153 G |
| 4,166,988 A | 9/1979 | Ciarcia et al. | 335/9 |
| 4,220,934 A | 9/1980 | Wafer et al. | 335/16 |
| 4,255,732 A | 3/1981 | Wafer et al. | 335/16 |
| 4,259,651 A | 3/1981 | Yamat | 335/16 |
| 4,263,492 A | 4/1981 | Maier et al. | 200/288 |
| 4,276,527 A | 6/1981 | Gerbert-Gaillard et al. | 335/39 |
| 4,297,663 A | 10/1981 | Seymour et al. | 335/20 |
| 4,301,342 A | 11/1981 | Castonguay et al. | 200/153 SC |
| 4,360,852 A | 11/1982 | Gilmore | 361/98 |
| 4,368,444 A | 1/1983 | Preuss et al. | 335/166 |
| 4,375,021 A | 2/1983 | Pardini et al. | 200/147 B |
| 4,375,022 A | 2/1983 | Daussin et al. | 200/148 R |

(List continued on next page.)

FOREIGN PATENT DOCUMENTS

| | | |
|---|---|---|
| BE | 819 008 A | 12/1974 |
| BE | 897 691 A | 1/1984 |
| DE | 12 27 978 | 11/1966 |

(List continued on next page.)

*Primary Examiner*—Stephen W. Jackson
*Assistant Examiner*—B. Benenson
(74) *Attorney, Agent, or Firm*—Cantor Colburn LLP (57) ABSTRACT

A method and apparatus for rejection of an inappropriate rating plug in an electronic trip unit for a circuit breaker including: a microprocessor programmed to determine an overcurrent condition of the circuit breaker; a nonvolatile memory in operable communication with the microprocessor; the rating plug releasably engaged with the microprocessor, the rating plug includes an identification register; wherein the microprocessor reads the identification register, the identification register includes an identification number; wherein the microprocessor accesses one of a plurality of programs in the nonvolatile memory based on the identification number; and wherein the one of a plurality of programs instructs said microprocessor to perform a validation of said rating plug for operation with said microprocessor.

34 Claims, 5 Drawing Sheets

U.S. PATENT DOCUMENTS

| | | |
|---|---|---|
| 4,376,270 A | 3/1983 | Staffen ................. 335/21 |
| 4,383,146 A | 5/1983 | Bur ................. 200/17 R |
| 4,392,036 A | 7/1983 | Troebel et al. ............. 200/322 |
| 4,393,283 A | 7/1983 | Masuda ................. 200/51.09 |
| 4,401,872 A | 8/1983 | Boichot-Castagne et al. ................. 200/353 G |
| 4,409,573 A | 10/1983 | DiMarco et al. ............. 335/16 |
| 4,435,690 A | 3/1984 | Link et al. ................. 335/37 |
| 4,467,297 A | 8/1984 | Boichot-Castagne et al. .. 335/8 |
| 4,468,645 A | 8/1984 | Gerbert-Gaillard et al. ... 335/42 |
| 4,470,027 A | 9/1984 | Link et al. ................. 335/16 |
| 4,479,143 A | 10/1984 | Watanabe et al. ............. 358/44 |
| 4,488,133 A | 12/1984 | McClellan et al. ........... 335/16 |
| 4,492,941 A | 1/1985 | Nagel ................. 335/13 |
| 4,541,032 A | 9/1985 | Schwab ................. 361/331 |
| 4,546,224 A | 10/1985 | Mostosi ................. 200/153 G |
| 4,550,360 A | 10/1985 | Dougherty ................. 361/93 |
| 4,562,419 A | 12/1985 | Preuss et al. ............. 335/195 |
| 4,589,052 A | 5/1986 | Dougherty ................. 361/94 |
| 4,595,812 A | 6/1986 | Tamaru et al. ............. 200/307 |
| 4,611,187 A | 9/1986 | Banfi ................. 335/16 |
| 4,612,430 A | 9/1986 | Sloan et al. ................. 200/327 |
| 4,616,198 A | 10/1986 | Pardini ................. 335/16 |
| 4,622,444 A | 11/1986 | Kandatsu et al. ........... 200/303 |
| 4,631,625 A | 12/1986 | Alexander et al. ............ 361/94 |
| 4,642,431 A | 2/1987 | Tedesco et al. ......... 200/153 G |
| 4,644,438 A | 2/1987 | Puccinelli et al. ............. 361/75 |
| 4,649,247 A | 3/1987 | Preuss et al. ............. 200/244 |
| 4,658,322 A | 4/1987 | Rivera ................. 361/37 |
| 4,672,501 A | 6/1987 | Bilac et al. ................. 335/16 |
| 4,675,481 A | 6/1987 | Markowski et al. .... 200/144 R |
| 4,682,264 A | 7/1987 | Demeyer ................. 361/96 |
| 4,689,712 A | 8/1987 | Demeyer ................. 361/96 |
| 4,694,373 A | 9/1987 | Demeyer ................. 361/96 |
| 4,710,845 A | 12/1987 | Demeyer ................. 361/96 |
| 4,717,985 A | 1/1988 | Demeyer ................. 361/96 |
| 4,733,211 A | 3/1988 | Castonguay et al. ........ 335/192 |
| 4,733,321 A | 3/1988 | Lindeperg ................. 361/96 |
| 4,764,650 A | 8/1988 | Bur et al. ............. 200/153 G |
| 4,768,007 A | 8/1988 | Mertz et al. ................. 335/202 |
| 4,780,786 A | 10/1988 | Weynachter et al. .......... 361/87 |
| 4,831,221 A | 5/1989 | Yu et al. ................. 200/553 |
| 4,870,531 A | 9/1989 | Danek ................. 361/93 |
| 4,883,931 A | 11/1989 | Batteux et al. ......... 200/148 R |
| 4,884,047 A | 11/1989 | Baginski et al. ............. 335/10 |
| 4,884,164 A | 11/1989 | Dziura et al. ................. 361/97 |
| 4,900,882 A | 2/1990 | Bernard et al. ......... 200/147 R |
| 4,910,485 A | 3/1990 | Bolongeat-Mobleu et al. ................. 335/195 |
| 4,914,541 A | 4/1990 | Tripodi et al. ................. 361/94 |
| 4,916,420 A | 4/1990 | Bartolo et al. ............. 335/172 |
| 4,916,421 A | 4/1990 | Pardini et al. ............. 335/185 |
| 4,926,282 A | 5/1990 | McGhie ................. 361/102 |
| 4,935,590 A | 6/1990 | Malkin et al. ........... 200/148 A |
| 4,937,706 A | 6/1990 | Schueller et al. ............ 361/396 |
| 4,939,492 A | 7/1990 | Raso et al. ................. 335/42 |
| 4,943,691 A | 7/1990 | Mertz et al. ................. 200/151 |
| 4,943,888 A | 7/1990 | Jacob et al. ................. 361/96 |
| 4,950,855 A | 8/1990 | Bolongeat-Mobleu et al. ................. 200/148 A |
| 4,951,019 A | 8/1990 | Gula ................. 335/166 |
| 4,952,897 A | 8/1990 | Barnel et al. ................. 335/147 |
| 4,958,135 A | 9/1990 | Baginski et al. ............. 335/8 |
| 4,958,252 A * | 9/1990 | Murphy ................. 361/93.3 |
| 4,965,543 A | 10/1990 | Batteux ................. 335/174 |
| 4,983,788 A | 1/1991 | Pardini ................. 200/16 R |
| 4,991,042 A * | 2/1991 | Tokarski et al. ........... 361/93.2 |
| 5,001,313 A | 3/1991 | Leclerq et al. ......... 200/148 B |
| 5,004,878 A | 4/1991 | Seymour et al. ........ 200/144 R |
| 5,029,301 A | 7/1991 | Nebon et al. ................. 335/16 |
| 5,030,804 A | 7/1991 | Abri ................. 200/323 |
| 5,057,655 A | 10/1991 | Kersusan et al. ........ 200/148 B |
| 5,077,627 A | 12/1991 | Fraisse ................. 361/93 |
| 5,083,081 A | 1/1992 | Barrault et al. ............. 324/126 |
| 5,095,183 A | 3/1992 | Raphard et al. ........ 200/148 A |
| 5,103,198 A | 4/1992 | Morel et al. ................. 335/6 |
| 5,115,371 A | 5/1992 | Tripodi ................. 361/106 |
| 5,120,921 A | 6/1992 | DiMarco et al. ............. 200/401 |
| 5,132,865 A | 7/1992 | Mertz et al. ................. 361/6 |
| 5,138,121 A | 8/1992 | Streich et al. ............. 200/293 |
| 5,140,115 A | 8/1992 | Morris ................. 200/308 |
| 5,153,802 A | 10/1992 | Mertz et al. ................. 361/18 |
| 5,155,315 A | 10/1992 | Malkin et al. ........... 200/148 R |
| 5,166,483 A | 11/1992 | Kersusan et al. ........ 200/144 A |
| 5,172,087 A | 12/1992 | Castonguay et al. ........ 335/160 |
| 5,178,504 A | 1/1993 | Falchi ................. 411/553 |
| 5,184,717 A | 2/1993 | Chou et al. ................. 200/401 |
| 5,187,339 A | 2/1993 | Lissandrin ............. 200/148 F |
| 5,198,956 A | 3/1993 | Dvorak ................. 361/106 |
| 5,200,724 A | 4/1993 | Gula et al. ................. 335/166 |
| 5,210,385 A | 5/1993 | Morel et al. ............. 200/146 R |
| 5,239,150 A | 8/1993 | Bolongeat-Mobleu et al. ................. 200/148 R |
| 5,260,533 A | 11/1993 | Livesey et al. ............. 200/401 |
| 5,262,744 A | 11/1993 | Arnold et al. ................. 335/8 |
| 5,280,144 A | 1/1994 | Bolongeat-Mobleu et al. ................. 200/148 R |
| 5,281,776 A | 1/1994 | Morel et al. ................. 200/144 |
| 5,296,660 A | 3/1994 | Morel et al. ............. 200/146 R |
| 5,296,664 A | 3/1994 | Crookston et al. ........... 200/401 |
| 5,298,874 A | 3/1994 | Morel et al. ................. 335/8 |
| 5,300,907 A | 4/1994 | Nereau et al. ............. 335/172 |
| 5,310,971 A | 5/1994 | Vial et al. ................. 200/244 |
| 5,313,180 A | 5/1994 | Vial et al. ................. 335/16 |
| 5,317,471 A | 5/1994 | Izoard et al. ................. 361/105 |
| 5,331,500 A | 7/1994 | Corcoles et al. ............. 361/93 |
| 5,334,808 A | 8/1994 | Bur et al. ................. 200/50 |
| 5,341,191 A | 8/1994 | Crookston et al. ............ 335/16 |
| 5,347,096 A | 9/1994 | Bolongeat-Mobleu et al. ................. 200/148 B |
| 5,347,097 A | 9/1994 | Bolongeat-Mobleu et al. ................. 200/148 B |
| 5,350,892 A | 9/1994 | Rozier ................. 200/144 B |
| 5,357,066 A | 10/1994 | Morel et al. ............. 200/17 R |
| 5,357,068 A | 10/1994 | Rozier ................. 200/148 R |
| 5,357,394 A | 10/1994 | Piney ................. 361/72 |
| 5,361,052 A | 11/1994 | Ferullo et al. ............. 335/172 |
| 5,373,130 A | 12/1994 | Barrault et al. ......... 200/147 R |
| 5,379,013 A | 1/1995 | Coudert ................. 335/17 |
| 5,424,701 A | 6/1995 | Castonguay et al. ........ 335/172 |
| 5,438,176 A | 8/1995 | Bonnardel et al. ........... 200/400 |
| 5,440,088 A | 8/1995 | Coudert et al. ............. 200/303 |
| 5,449,871 A | 9/1995 | Batteux et al. ............. 200/401 |
| 5,450,048 A | 9/1995 | Leger et al. ................. 335/132 |
| 5,451,729 A | 9/1995 | Onderka et al. ............. 200/18 |
| 5,457,295 A | 10/1995 | Tanibe et al. ................. 200/293 |
| 5,467,069 A | 11/1995 | Payet-Burin et al. ......... 335/42 |
| 5,469,121 A | 11/1995 | Payet-Burin ................. 335/16 |
| 5,475,558 A | 12/1995 | Barjonnet et al. ............. 361/64 |
| 5,477,016 A | 12/1995 | Baginski et al. .......... 200/43.11 |
| 5,479,143 A | 12/1995 | Payet-Burin ................. 335/202 |
| 5,483,212 A | 1/1996 | Lankuttis et al. ............ 335/132 |
| 5,485,343 A | 1/1996 | Santos et al. ................. 361/115 |
| D367,265 S | 2/1996 | Yamagata et al. ......... D13/160 |
| 5,490,086 A * | 2/1996 | Leone et al. ................. 700/292 |
| 5,493,083 A | 2/1996 | Olivier ................. 200/17 R |
| 5,504,284 A | 4/1996 | Lazareth et al. ........... 200/50 R |
| 5,504,290 A | 4/1996 | Baginski et al. ............. 200/401 |
| 5,510,761 A | 4/1996 | Boder et al. ................. 335/172 |
| 5,512,720 A | 4/1996 | Coudert et al. ............. 200/400 |
| 5,515,018 A | 5/1996 | DiMarco et al. ............. 335/16 |

| | | | |
|---|---|---|---|
| 5,519,561 A | 5/1996 | Mrenna et al. | 361/105 |
| 5,534,674 A | 7/1996 | Steffens | 218/154 |
| 5,534,832 A | 7/1996 | Duchemin et al. | 335/16 |
| 5,534,835 A | 7/1996 | McColloch et al. | 335/172 |
| 5,534,840 A | 7/1996 | Cuingnet | 337/1 |
| 5,539,168 A | 7/1996 | Linzenich | 200/303 |
| 5,543,595 A | 8/1996 | Mader et al. | 200/401 |
| 5,552,755 A | 9/1996 | Fello et al. | 335/18 |
| 5,581,219 A | 12/1996 | Nozawa et al. | 335/132 |
| 5,604,656 A | 2/1997 | Derrick et al. | 361/187 |
| 5,608,367 A | 3/1997 | Zoller et al. | 335/132 |
| 5,784,233 A | 7/1998 | Bastard et al. | 361/36 |

FOREIGN PATENT DOCUMENTS

| | | |
|---|---|---|
| DE | 30 47 360 | 6/1982 |
| DE | 38 02 184 | 8/1989 |
| DE | 38 43 277 | 6/1990 |
| DE | 44 19 240 | 1/1995 |
| EP | 0 061 092 | 9/1982 |
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |
| EP | 0 224 396 | 6/1987 |
| EP | 0 235 479 | 9/1987 |
| EP | 0 239 460 | 9/1987 |
| EP | 0 258 090 | 3/1988 |
| EP | 0 264 313 | 4/1988 |
| EP | 0 264 314 | 4/1988 |
| EP | 0 283 189 | 9/1988 |
| EP | 0 283 358 | 9/1988 |
| EP | 0 291 374 | 11/1988 |
| EP | 0 295 155 | 12/1988 |
| EP | 0 295 158 | 12/1988 |
| EP | 0 309 923 | 4/1989 |
| EP | 0 313 106 | 4/1989 |
| EP | 0 313 422 | 4/1989 |
| EP | 0 314 540 | 5/1989 |
| EP | 0 331 586 | 9/1989 |
| EP | 0 337 900 | 10/1989 |
| EP | 0 342 133 | 11/1989 |
| EP | 0 367 690 | 5/1990 |
| EP | 0 371 887 | 6/1990 |
| EP | 0 375 568 | 6/1990 |
| EP | 0 394 144 | 10/1990 |
| EP | 0 394 922 | 10/1990 |
| EP | 0 399 282 | 11/1990 |
| EP | 0 407 310 | 1/1991 |
| EP | 0 452 230 | 10/1991 |
| EP | 0 555 158 | 8/1993 |
| EP | 0 560 697 | 9/1993 |
| EP | 0 567 416 | 10/1993 |
| EP | 0 595 730 | 5/1994 |
| EP | 0 619 591 | 10/1994 |
| EP | 0 665 569 | 8/1995 |
| EP | 0 700 140 | 3/1996 |
| EP | 0 889 498 | 1/1999 |
| FR | 2 410 353 | 6/1979 |
| FR | 2 512 582 | 3/1983 |
| FR | 2 553 943 | 4/1985 |
| FR | 2 592 998 | 7/1987 |
| FR | 2 682 531 | 4/1993 |
| FR | 2 697 670 | 5/1994 |
| FR | 2 699 324 | 6/1994 |
| FR | 2 714 771 | 7/1995 |
| GB | 2 233 155 | 1/1991 |
| SU | 1 227 978 | 4/1986 |
| WO | 92/00598 | 1/1992 |
| WO | 92/05649 | 4/1992 |
| WO | 94/00901 | 1/1994 |

* cited by examiner

DIGITAL RATING PLUG FOR ELECTRONIC TRIP UNIT IN CIRCUIT BREAKERS

BACKGROUND OF INVENTION

Circuit breakers are widely used to protect electrical lines and equipment. The circuit breaker monitors current through an electrical conductor and trips to interrupt the current if certain criteria are met. One such criterion is the maximum continuous current permitted in the protected circuit. The maximum continuous current the circuit breaker is designed to carry is known as the frame rating. However, the breaker can be used to protect circuits in which the maximum continuous current is less than the circuit breaker frame rating, in which case the circuit breaker is configured to trip if the current exceeds the maximum continuous current established for the particular circuit in which it is used. This is known as the circuit breaker current rating. Obviously, the circuit breaker current rating can be less than but cannot exceed the frame rating.

An electronic trip unit ("ETU") is a device that is used in conjunction with an electro-mechanical circuit breaker to control the current verses time trip response. The time versus current trip characteristics are, in part, a function of the maximum continuous current permitted by the circuit breaker. This maximum continuous current is also called the current rating of the circuit breaker. As long as the current remains below this maximum continuous current rating, the breaker will remain closed. Momentary low magnitude excursions above the rated current are tolerated; however, persistent overcurrents result in tripping of the breaker. The time delay and generation of the trip signal is an inverse function of the magnitude of the current. For very large magnitude overcurrents, such as would be produced by a fault, the microcomputer is programmed to generate a trip signal instantaneously.

The modification of the Current vs. Trip time response curve is a serious matter. For safety purposes, the circuit breaker must be properly configured to provide the type of protection judged by the customer or plant engineer to be appropriate. Therefore the modification to this protection must also be considered to be a very serious event and handled in a way that prohibits errors.

Typically, the circuit breaker current rating is set by a rating resistor (a "burden resistor") which is selected to generate a preset voltage when a current proportional to the maximum continuous current permitted in the protected circuit passes through the rating resistor. In order to provide for adjustment of the current rating so that the circuit breaker can be used to protect circuits with different maximum continuous currents, it is known to incorporate the rating resistor in a replaceable rating plug which may be selectively inserted into the breaker.

Electronic trip circuit interrupters are designed to interrupt overcurrent conditions over a wide range of ampere ratings. The current through the protected electric power circuit is continuously sensed by means of current transformers and a voltage signal is supplied to the signal processor within the ETU circuit by means of so-called "burden resistors", such as rating resistors in a rating plug. The size of the burden resistor accordingly sets the ampere rating of the corresponding circuit interrupter. A common electronic circuit interrupter could therefore operate over a wide range of ampere ratings by merely changing the value of the burden resistor within the electronic trip circuit. It is important to prevent an electronic circuit interrupter from being inserted within an electrical distribution circuit for which the circuit interrupter is over-rated. It is perhaps equally important not to insert a circuit interrupter within an electric power distribution circuit for which the circuit interrupter is under-rated, as so-called "nuisance-tripping" could occur. It is also important to insure that a circuit interrupter is not inserted within an electric power distribution circuit with no rating plug or burden resistor whatsoever.

Field replaceable rating plugs are known. These plugs are field installable and may be mechanical for use with thermal-magnetic trip units or may use a combination of analog circuit scaling and digital techniques to change the ETU response. It is typical for these plugs to provide mechanical rejection of plugs that are not suited to certain ranges or frame sizes.

A typical method to prevent incompatible ETU/rating plug combinations includes a first manufacturing process of providing interlocking pins that can be mechanically modified by a secondary manufacturing process of breaking out pieces. The secondary manufacturing process breaks out small pieces of plastic on the housing of the rating plug and complementary pieces on the housing of the ETU.

A problem associated with mechanical rejection of plugs is costs associated with the secondary operation and the limitation of the number of combinations that can be rejected. In some cases the mechanical rejection method is not reliable because some operators, using great force, can insert an incorrect rating plug.

SUMMARY OF INVENTION

The above discussed and other drawbacks and deficiencies are overcome or alleviated by a method and apparatus for rejection of an inappropriate rating plug in an electronic trip unit for a circuit breaker including; a microprocessor programmed to determine an overcurrent condition of the circuit breaker; a nonvolatile memory in operable communication with the microprocessor; the rating plug releasably engaged with the microprocessor, the rating plug includes an identification register; wherein the microprocessor reads the identification register, the identification register includes an identification number; wherein the microprocessor accesses one of a plurality of programs in the nonvolatile memory based on the identification number; and wherein the one of a plurality of programs instructs said microprocessor to perform a validation of said rating plug for operation with said microprocessor.

The above discussed and other features and advantages of the present disclosure will be appreciated and understood by those skilled in the art from the following detailed description and drawings.

BRIEF DESCRIPTION OF DRAWINGS

Referring to the FIGURES wherein like elements are numbered alike in the several FIGURES.

DETAILED DESCRIPTION

Figure 1:
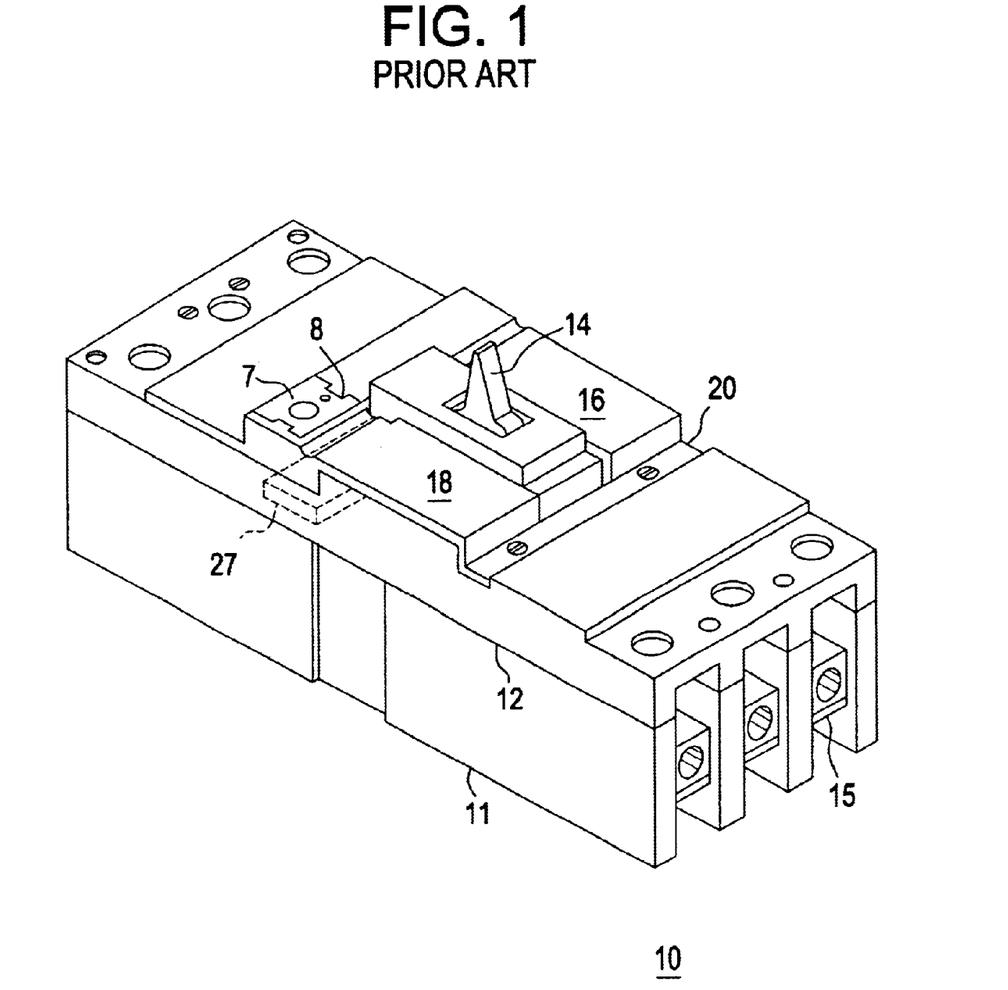
FIG. 1 is a top perspective view of an electronic circuit breaker according to the prior art.

The circuit breaker 10 shown in FIG. 1 contains an electronic trip unit 27. The circuit breaker consists of an electrically insulated case or frame 11 to which a cover 12 of similar isolative material is attached. An external handle 14 allows the circuit breaker to be turned ON and OFF independent of the electronic trip unit (ETU) 27 contained within the cover. Electrical connection with the interior current-carrying components is made by load terminal straps 15 extending from one side of the case 11 and then through the line terminal straps 13 (not shown) extending from the opposite side thereof. A pair of accessory doors 16, 18 allow for the provision of field installable accessories. A rating plug 7 extends within the rating plug receptacle 8 within the circuit breaker accessory cover 20 and connects with the circuit breaker trip unit 27 to set the circuit breaker ampere rating. Although a three-phase molded case circuit breaker is shown, it should be appreciated that this disclosure is applicable to other types of circuit breakers, including those with more or less phases.

Figure 2:
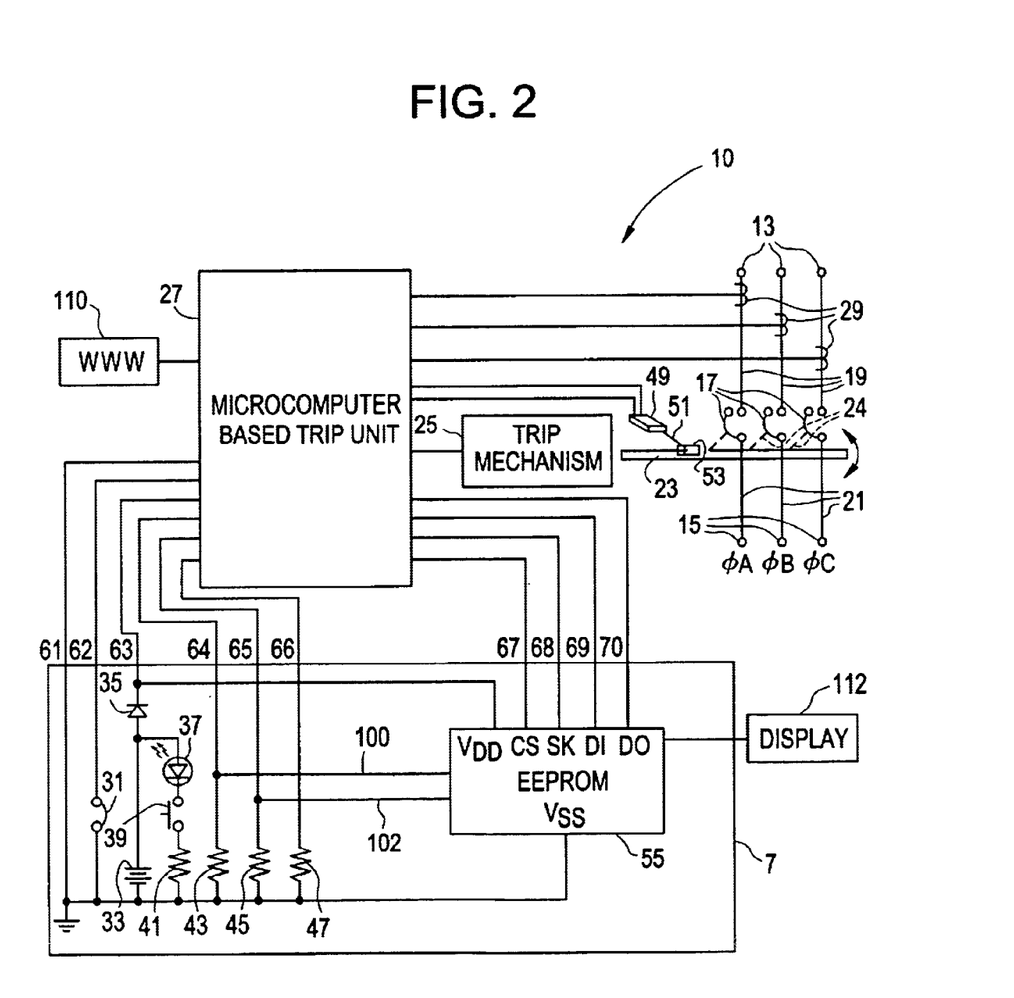
FIG. 2 is a schematic circuit diagram of one embodiment of a digital rating plug usable in the circuit breaker of FIG. 1.

As shown in FIG. 2, the circuit breaker 10 includes line terminals 13 for connection to a three-phase (phases A, B, and C) source of ac power (not shown) and corresponding load terminals 15. The circuit breaker 10 also includes a set of contacts 17 for each phase A, B, and C connected to the line terminals by leads 19 and connected to the load terminals by conductors 21. The contacts 17 are operated by a trip bar 23 of an operating mechanism (not shown) which in turn is operated by a trip mechanism 25. The trip mechanism is controlled by a microcomputer based trip unit 27. The microcomputer based trip unit 27 monitors the phase currents through current transformers or current monitors 29, and is programmed to implement predetermined time versus current tripping characteristics which result in actuation of the trip mechanism 25 to actuate the operating mechanism, generally shown at 24, which opens the contacts 17. A micro-switch 49, having an actuation arm 51 which is operated by a cam 53 on the trip bar 23 of the circuit breaker 10, may send signals to the microcomputer based trip unit 27 for counting the number of mechanical operations of the operating mechanism, which is proportional to the wear exerted on the circuit breaker 10.

Still referring to FIG. 2, rating plug 7 may have pins which connect the rating plug 7 with microcomputer based trip unit 27. The pin 61 may be a common ground. Pin 62 may connect a removable jumper 31 which if present may indicate that the circuit breaker is connected in a 60 Hz installation, for example, and if absent, identifies a 50 Hz installation, for example. The removable rating plug 7 may also be provided with a battery 33 protected with a blocking diode 35 which is connected with the microcomputer based trip unit 27 through pin 63. This battery 33 may provide power to LED indicators (not shown) controlled by the microcomputer based trip unit 27 when the circuit breaker 10 is tripped. This battery 33 may further be necessary in an installation where the circuit breaker 10 is powered by the protected circuit, and thus, where power is lost when the circuit breaker 10 is tripped. An LED 37 in the rating plug 7 may provide an indication of the condition of the battery 33 when the test button 39 is depressed. A resistor 41 limits the current through the LED 37. Pins 62 and 63 and their associated elements are optionally provided.

The rating plug 7 may also include three precision resistors 43, 45, 47, which are connected to the common ground and through pins 64, 65, 66, respectively, to the microcomputer based trip unit 27. The resistor 43 provides a reference for the microcomputer for the frame rating of the circuit breaker. The resistor 45 establishes the current rating of the circuit breaker by providing a reference to the microcomputer for the maximum continuous current. The value of this resistor is selectable to set the desired current rating. The resistor 47 is a calibration resistor for the microcomputer based trip unit 27.

A non-volatile memory 55, such as an erasable electrically programmable read only memory (EEPROM), is provided in the rating plug 7. The EEPROM 55 is powered through the input $V_{DD}$ and is connected to the common ground through input $V_{SS}$. The EEPROM 55 may also have a chip select input CS, a serial clock input SK, a data in terminal DI through which the EEPROM receives data from the microcomputer, and a data output terminal, DO through which data in the EEPROM is read by the microcomputer. The CS, SK, DI, and DO terminals are connected to the microcomputer through pins 67, 68, 69, and 70, respectively, of the rating plug 7.

Further transmitted to the EEPROM 55 is information regarding the resistors 43 and 45 through leads 100 and 102. That is, the frame rating of the circuit breaker and current rating of the circuit breaker is made available to the EEPROM 55 for reasons which will be further described below. Alternatively, as further described with respect to FIG. 4, pins 64, 65 could connect the microcomputer 27 directly to EEPROM 55, with current rating and frame rating information stored in the EEPROM 55 at the time of delivery to the customer. This embodiment eliminates the need for resistors within the rating plug 7. Although separate pins have been described for transferring current rating and frame rating information from the EEPROM 55, it should be understood that such transference could also occur through pins 69, 70, for example, thus reducing the number of pins extending from the rating plug 7 and therefore reducing the chance for breakage.

The World Wide Web ("WWW"), as exemplified generally at 110, may be used to modify rating plug 7 on microcomputer based trip unit or ETU 27. The WWW 110 can be used in an exemplary embodiment to communicate information to the customer's ETU 27 and that information will properly modify the response curve of the ETU 27 according to the customer's wishes. The method provides a technique that detects errors and upon the detection of these errors causes the ETU 27 to revert to a safe mode of operation as described below.

Rating plug 7 allows the circuit interruption rating to be set by replacing rating plug 7 with a different rating plug. For instance, rating plug 7 may be used to set circuit breaker at 800 amperes maximum current. Rating plug 7 may be subsequently changed to set the maximum rating to 1200 amperes.

Like the mechanical rejection in the current design of prior art rating plugs, an exemplary embodiment of the present disclosure employs a digital or firmware rejection scheme that will not allow an improper rating plug 7 to be installed on an ETU 27. For example, with the stored current rating and frame rating of the circuit breaker in the EEPROM 55, it can be determined by the ETU 27 through comparison whether the current rating selected exceeds the frame rating of the circuit breaker, in which case the ETU 27 may reject the attempted rating plug change and shall preferably revert to a safe mode of operation.

The safe mode of operation includes tripping the circuit breaker 10 is the ETU detects an improper installation combination of rating plug, ETU and breaker frame.

Alternatively, when an improper combination is detected, LEDs that are normally used for other status indications may blink, for example, LED 37. An improper combination may also cause the ETU to revert to a very sensitive setting, such that very small amounts of current cause the circuit breaker to trip. If the ETU is attached to a LAN or WWW, the ETU may send an error code to a host controller or remote computer indicating an improper combination.

The ETU 27 shall preferably further have a method of indicating its new and/or old rating to the customer. This could be a display 112 that is either dedicated to the display of rating information or that is used for another purpose but can enter into a mode that allows it to display rating information.

Figure 3:
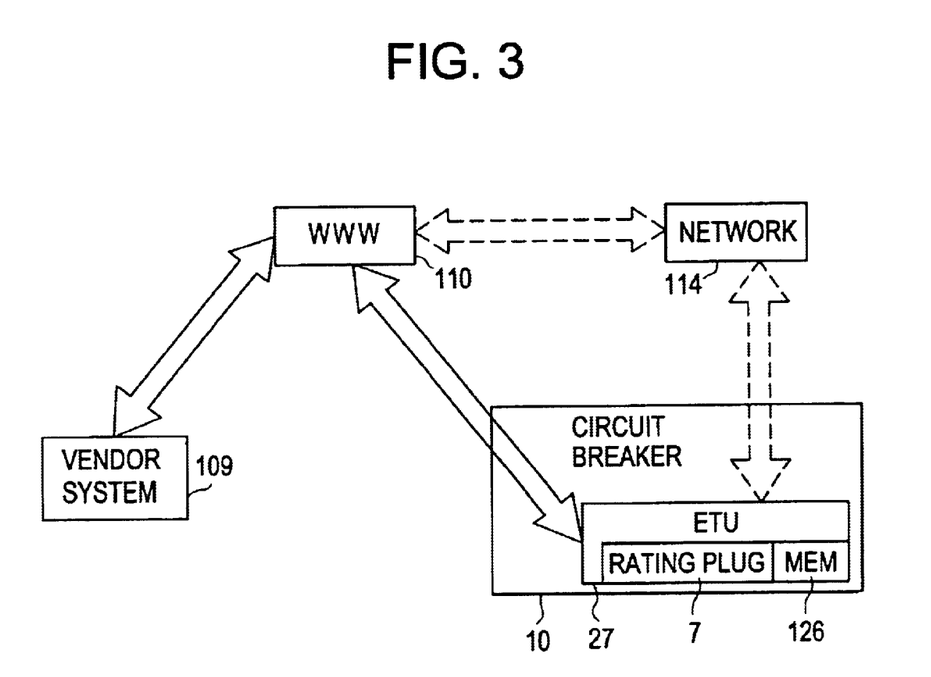
FIG. 3 is a diagrammatic representation of a system in the present method employing the digital rating plug and ETU.

Turning now to FIG. 3, the ETU 27 of the present invention may be designed to either connect directly to the WWW 110 or it may be connected to another network 114 that is then connected to the WWW 110. The ETU firmware may have a session with a vendor system 109 to communicate new rating plug information. During this communication there is preferably an interchange of data that will cause the ETU 27 to reject improper rating plug installations.

Figure 4:
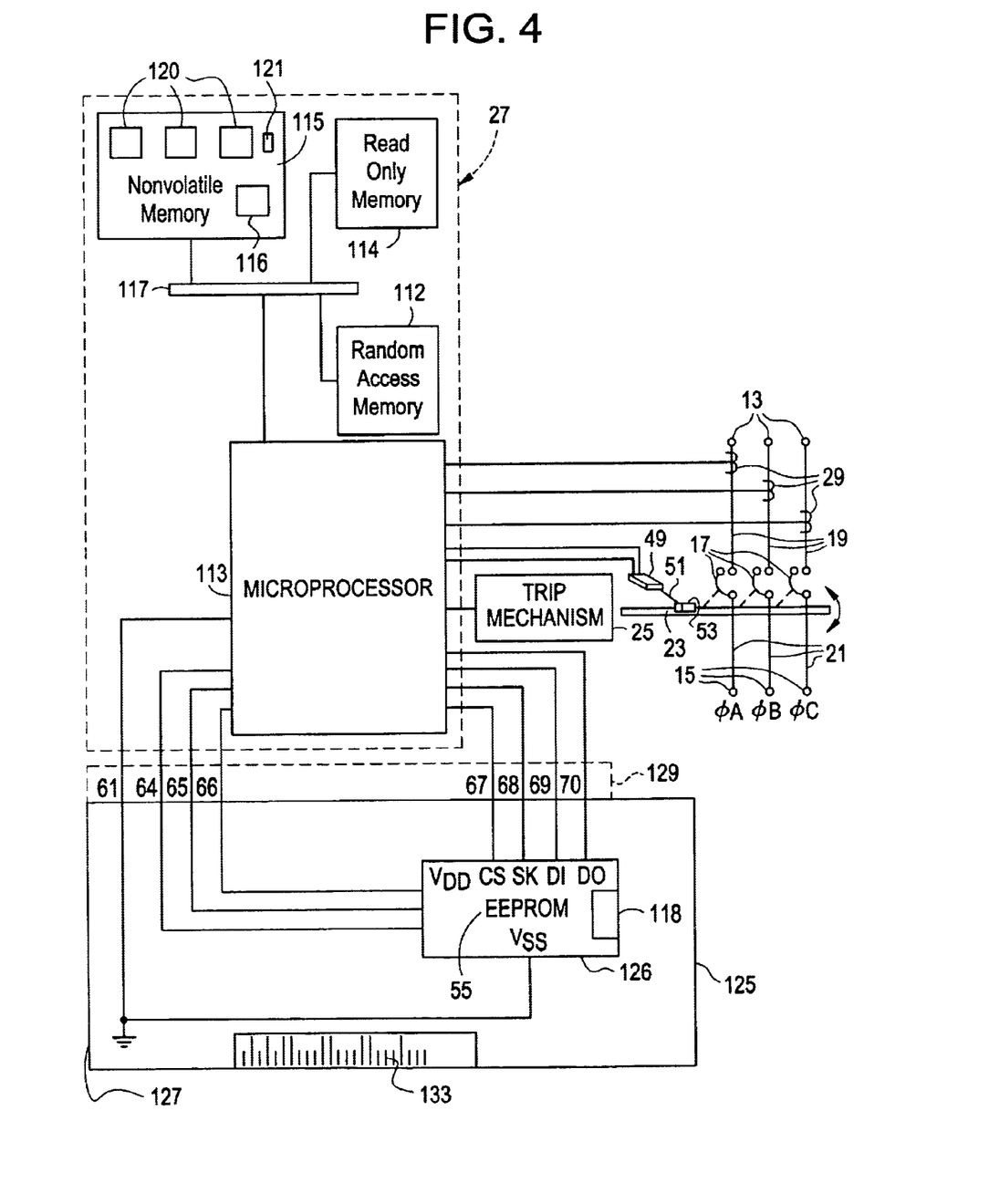
FIG. 4 is a schematic circuit diagram of another embodiment usable in the circuit breaker of FIG. 1.

Referring to FIG. 4, ETU 27 of an exemplary embodiment includes circuitry that provides the rating plug information to be stored in some type of non-volatile memory 115, similar to and communicable with the EEPROM 55 within the rating plug 7. Because this information is used in the operation of the ETU 27, the integrity of this data at power up and during the operation of the ETU is preferably ensured. Electronic trip unit 27 includes microprocessor 113, a random access memory (RAM) 112, a read only memory (ROM) 114, and the nonvolatile memory 115. RAM 112 is coupled with microprocessor 113 via a bus 117 and is used for the temporary storage of current and voltage data and as a scratch pad memory. ROM 115 is coupled with microprocessor 13 via bus 117 and contains boot code data. Nonvolatile memory 115 is also coupled with microprocessor 113 via bus 117 and stores a control program 116 that instructs microprocessor 112 to perform certain functions such as overcurrent protection, metering, protective relaying and communications. Nonvolatile memory 115 also stores a plurality of programs 120 that implement rating plug 7 functions and a look-up table 121 that maps each program 120 with a corresponding rating plug identification number. Microprocessor 113 controls RAM 112, ROM 114, nonvolatile memory 115, and bus 117. Stored in identification register 118 is a binary representation of the rating plug identification number unique to the type of rating plug 7.

A completely digital methodology for rejecting a rating plug installed in a circuit breaker is further provided in the present disclosure. Still referring to FIG. 4, a plug-in device 125, such as a rating plug 7, that has identification and optioning data programmed into a non-volatile memory 126 is used. The ETU 27 preferably uses microprocessor 113 for control. Microprocessor 113 reads the digital data from the plug-in memory 126 and uses the identification and option data to compare the rating plug identification number with allowable combinations of rating plug, ETU and circuit breaker frame combinations in a look-up table 121. If the rating plug installed is improperly installed because it is not one of a number of allowable combinations listed in look-up table 121, the ETU generates a signal to actuate a safe mode, including tripping the circuit breaker to prevent current flow.

By using a completely digital method to reject an improper rating plug installed with an ETU 27 used in circuit breakers by field technicians, errors that were commonplace with mechanical rejection methods are eliminated and the number of possible rating plug, ETU, and circuit breaker variations that must be dealt with in the factory are minimized by replacing many different ratings plugs with a single rating plug configuration having memory that may be reprogrammed. Such a single configuration reduces manufacturing costs, while maximizing possible variations of rating plug, ETU, and breaker combinations using digital methodology to check for proper rating plug installation in a particular combination.

Figure 5:
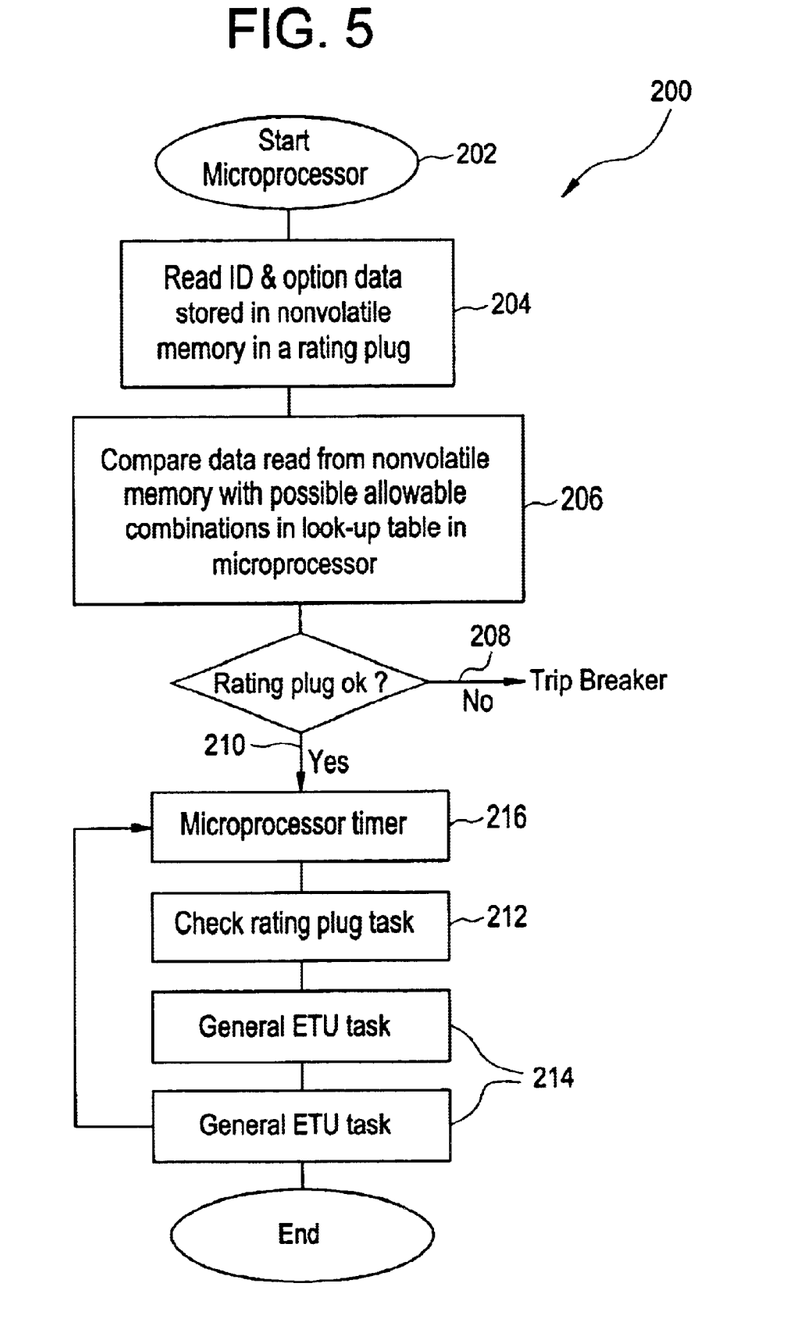
FIG. 5 is a flow chart providing an operation of the digital rating plug and the electronic trip unit of FIG. 2.

As shown with reference to FIG. 5, preferably, the all-digital rating plug 125 is a small circuit in a plastic shell 127 that requires only a programmable non-volatile memory 126, a connector 129 (shown with phantom lines), which may hold the pins 61–70 for installation in the ETU 27, and a label 131. Preferably, the rating plug memory 126 is programmed at the factory where it is assembled and then identified with a label 131 containing indicia such as a bar code 133 and/or other alphanumeric identifying indicia. The rating plug 125 is preferably field installable. Upon power up, the microprocessor in the ETU 27 will read the identification and option information from the non-volatile programmable memory 126 and use this data to compare with possible combinations of rating plugs, ETUs, and breakers that can be used together in a lookup table in the embedded microprocessor of the ETU. The all digital rating plug 125 can be used in the system for changing rating plug information of a circuit breaker and a method of remotely altering rating plug information as described in connection with FIG. 3.

Referring to FIGS. 4 and 5, a digital rating plug 125 and electronic trip unit 27 functions as follows. Control program 116 instructs microprocessor 113 to perform a process 200, which is started when microprocessor 113 is first booted up (block 202). A digital rating plug 125 is plugged into a pin connector (not shown), which couples rating plug 125 with microprocessor 113. Control program 116 instructs microprocessor 113 to periodically read identification register 118 located at rating plug 125 (block 204). Control program 116 compares identification number with allowable combinations via a look-up table 121. Look-up table 121 lists the possible combinations of rating plugs, ETUs and breakers that can be used together (block 206). If the identification number is not listed, control program 116 instructs microprocessor 113 to put the circuit in safe mode, for example by tripping the circuit breaker (block 208). As aforementioned, microprocessor 113 may also generate other signals in response of an illegal combination to put an operator on notice of an improper rating plug installation. If the identification number is listed in look-up table 121, then control program 116 instructs microprocessor 113 to compare the identification number read from identification register 118 with the identification numbers listed in look-up table 121 and determine the program 120 associated with the identification number (block 210). Control program 116 then instructs microprocessor to retrieve and execute the associated program 120 and check the rating plug at regular intervals (block 212) and do general ETU tasks (blocks 214) via a microprocessor timer (block 216).

Rating plug 7 and electronic trip unit 27 provide the operator with a more flexible electronic trip unit. The operator will be able to upgrade the electronic trip unit after purchasing the electronic trip unit. The operator will also be able to change the ETU response of the electronic trip unit easily by changing the rating plug in the electronic trip unit. Thus, the digital rejection of an improper rating plug offers more proper combinations with a single configuration for a rating plug, while allowing rejection of an improper use of an illegal rating plug/ETU combination by electrically rejecting its use rather than by mechanical rejection when attempting to install a rating plug. In this way, the electronic rejection cannot be easily bypassed as in mechanical rejection by forcing an improper rating plug to be improperly installed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic trip unit for a circuit breaker comprising:
   a microprocessor, said microprocessor programmed to determine an overcurrent condition of said circuit breaker;
   a nonvolatile memory in operable communication with said microprocessor;
   a rating plug releasably engaged with said microprocessor, said rating plug includes an identification register;
   wherein said microprocessor reads said identification register, said identification register including an identification number;
   wherein said microprocessor accesses one of a plurality of programs in said nonvolatile memory based on said identification number; and
   wherein said one of a plurality of programs instructs said microprocessor to perform a validation of said rating plug for operation with said microprocessor.

2. The electronic trip unit of claim 1 wherein said validation includes an error detection program processable by said microprocessor for rejecting inappropriate rating plugs used with a selected circuit breaker frame and electronic trip unit.

3. The electronic trip unit of claim 1 wherein said microprocessor performs said validation when said microprocessor is powered up.

4. The electronic trip unit of claim 1 wherein said rating plug includes a display, said display is indicative of said validation.

5. The electronic trip unit of claim 1 wherein said validation causes said microprocessor to generate a signal indicative of an improper rating plug and electronic trip unit combination.

6. The electronic trip unit of claim 5 wherein said signal causes the circuit breaker to trip.

7. The electronic trip unit of claim 5 wherein said signal causes the microprocessor to trip at a first setting, said first setting includes a low current flow setting.

8. The electronic trip unit of claim 5 wherein said signal is indicated on a display indicative of an inappropriate rating plug and electronic trip unit combination.

9. The electronic trip unit of claim 8 wherein said display includes an LED, said signal is indicated on said LED.

10. The electronic trip unit of claim 9 wherein said signal causes said LED to blink indicative of an inappropriate rating plug and electronic trip unit combination.

11. The electronic trip unit of claim 5 wherein said signal is transmitted on a LAN to a host controller, said signal generates an error code to said host controller.

12. The electronic trip unit of claim 1 wherein said rating plug includes a label indicating a current rating of said rating plug.

13. A circuit breaker comprising:
   an electrical contact;
   an operating mechanism arranged to separate electrical contacts;
   a trip actuator in mechanical communication with said operating mechanism;
   an electronic trip unit in operable communication with said trip actuator;
   wherein said electronic trip unit including:
      a microprocessor, said microprocessor programmed to determine an overcurrent condition of said circuit breaker;
      a nonvolatile memory in operable communication with said microprocessor;
      a rating plug releasably engaged with said microprocessor, said rating plug includes an identification register;
   wherein said microprocessor reads said identification register, said identification register including an identification number;
   wherein said microprocessor accesses one of a plurality of programs in said nonvolatile memory based on said identification number; and
   wherein said one of a plurality of programs instructs said microprocessor to perform a validation of said rating plug for operation with said microprocessor.

14. The circuit breaker of claim 13 wherein said validation includes an error detection program processable by said microprocessor for rejecting inappropriate rating plugs used with a selected circuit breaker frame and electronic trip unit.

15. The circuit breaker of claim 13 wherein said microprocessor performs said validation when said microprocessor is powered up.

16. The circuit breaker of claim 13 wherein said rating plug includes a display, said display is indicative of said validation.

17. The circuit breaker of claim 13 wherein said validation causes said microprocessor to generate a signal indicative of an improper rating plug and electronic trip unit combination.

18. The circuit breaker of claim 17 wherein said signal causes the circuit breaker to trip.

19. The circuit breaker of claim 17 wherein said signal causes the microprocessor to trip at a first setting, said first setting includes a low current flow setting.

20. The circuit breaker of claim 17 wherein said signal is indicated on a display indicative of an inappropriate rating plug and electronic trip unit combination.

21. The circuit breaker of claim 20 wherein said display includes an LED, said signal is indicated on said LED.

22. The circuit breaker of claim 21 wherein said signal causes said LED to blink indicative of an inappropriate rating plug and electronic trip unit combination.

23. The circuit breaker of claim 17 wherein said signal is transmitted on a LAN to a host controller, said signal generates an error code to said host controller.

24. The circuit breaker of claim 13 wherein said rating plug includes a label indicating a current rating of said rating plug.

25. A method of rejecting an inappropriate rating plug for use with an electronic trip unit, said method comprising:

starting a microprocessor, said microprocessor programmed to determine an overcurrent condition of a circuit breaker;

identifying a rating plug releasably engaged with the electronic trip unit and in operable communication with said microprocessor;

determining a program associated with said rating plug; and executing said program, said program performs a validation of said rating plug.

26. The method of claim 25 wherein said identifying a rating plug further comprises reading a number stored in an identification register at said rating plug.

27. The method of claim 26 wherein said determining a program further comprises comparing said number with a plurality of numbers at a look-up table.

28. The method of claim 25 wherein said determining a program further comprises retrieving said program from a nonvolatile memory.

29. The method of claim 25 wherein said validation further comprises a notification from said microprocessor to a host controller upon rejection of an inappropriate rating plug.

30. An electronic trip unit for a circuit breaker comprising:

a microprocessor, said microprocessor programmed to determine an overcurrent condition of the circuit breaker;

a rating plug releasably engaged with said microprocessor; and wherein said microprocessor includes:
means for identifying said rating plug,
means for determining a program associated with said rating plug, and
means for executing said program, said program performs a validation of said rating plug.

31. The electronic trip unit of claim 30 wherein said rating plug includes a display.

32. The electronic trip unit of claim 30 wherein said display is indicative of said validation of said rating plug.

33. The electronic trip unit of claim 30 wherein said validation generates a signal indicative of an inappropriate rating plug and electronic trip unit combination.

34. The trip unit of claim 33 wherein said signal result in a safe mode operation of the circuit breaker.

* * * * *